Patented Jan. 26, 1954

2,667,268

UNITED STATES PATENT OFFICE 2,667,268

AQUEOUS SOLUTION INERT TO GELATIN

William C. Griffin, West Chester, Pa., assignor to Atlas Powder Company, Wilmington, Del., a corporation of Delaware No Drawing. Application March 22, 1951, Serial No. 217,077

6 Claims. (Cl. 206—84)

The present invention relates to aqueous solutions which are non-softeners of gelatin.

It is an object of the present invention to provide aqueous solutions inhibited against the softening of gelatin films.

Another object of the invention is to provide an aqueous carrier for water soluble substances which will not soften gelatin films.

A further object is to provide gelatin capsulated aqueous solutions.

Gelatin films are commonly recognized as highly imbibitous toward water. When in contact with water this property causes a softening of an otherwise hard gelatin surface. Contact with any appreciable quantity of water causes the gelatin to dissolve. It is this solubility property in water which makes gelatin capsules convenient carriers for predetermined aliquots of medicinals, foods, cosmetics, and the like. On the other hand, it has been practical to capsulate only anhydrous materials to prevent attack of the capsule by any moisture which might be present.

The advantages which result from the capsulation of aqueous solutions are obvious. Many substances are produced in aqueous solution, and separation and drying steps are costly and time consuming. Some materials, such as certain classes of vitamins, lose part of their potency when exposed to rigorous conditions common to a drying operation. It has been common to employ fatty oils as carriers for the anhydrous active ingredients referred to hereinafter as the "bodied" components. However, in the case of polar bodied components, as for instance many medicinals, vitamins, flavors, perfumes, foaming agents, detergents, cosmetics, food products, and the like, such a carrier limits the concentration due to the low solubility of the active substance. On the other hand, use of an aqueous carrier permits higher concentrations of such polar active materials. Alternatively the capsule size can be reduced under conditions of higher concentration, which is a distinct advantage in products intended for oral consumption.

According to the present invention it has been discovered that a solution containing as much as 25% or more water, when properly inhibited as described hereinafter, may be capsuled in water soluble gelatin without the usual, deleterious softening effect even after extended storage periods.

The stabilization of aqueous solution against gelatin softening is accomplished in accordance with the present invention by the presence of hydroxy aliphatic ethers of aliphatic polyols in a proportion of at least 1:1 with reference to the water present. It is preferred that the hydroxy aliphatic ether of the polyhydric alcohol be present in a proportion of at least 2:1 with reference to the water.

The hydroxy aliphatic ethers of aliphatic polyols as employed in the present invention include the hydroxy ethylene, propylene and butylene ethers of the various glycols and polyglycols such as ethylene, propylene, butylene, polyethylene, polypropylene and polybutylene glycols and as well as their hydroxy derivatives such as glycerine, polyglycerols, dioxyglycerine, and the higher polyols including the tetritols, pentitols and hexitols. Among compounds suitable for etherification may be mentioned ethylene glycol, diethylene glycol, triethylene glycol, and the higher polyethylene glycols such as nonaethylene glycol; propylene glycol, dipropylene glycol, tripropylene glycol and the higher polypropylene glycols; glycerol, diglycerol, polyglycerols, sorbitol, mannitol and the like. The ether derivatives of these materials may be formed by their reaction with alkylene oxides such as ethylene oxide, propylene oxide or butylene oxide as such or after condensation of the alkylene oxide in the presence of water. Furthermore, mixed derivatives may be formed by consecutive reactions of different alkylene oxides. Polyoxyalkylene chain lengths may vary from an average of 1 to 100 ether groups per mol of polyol, the choice being governed largely by the solubility characteristics of the bodied component. Generally, polyoxyalkylene chain lengths above 6 ether groups are preferred due to their convenient viscosity characteristics. Such materials are well known in the art and are described in United States Patents to Schmidt et al., Nos. 1,922,459 and 1,959,930; Schoeller et al., No. 1,970,578; Orthner et al., No. 2,089,569; and many other domestic and foreign publications.

The inhibitors are added to the aqueous solution in the range of about 50 to 95%. The polyol derivative is preferably present in the carrier to at least 60%. It is apparent, of course, that the softening-inhibition effect will vary slightly among the various ether polyalcohols. All such inhibited solutions tend to soften the gelatin above the upper limit of 50% water. Some show a slight softening at 40% water. Maximum protection is afforded where the water concentration is 25% or below. In general, as water concentration decreases the protective influence of all inhibitors is more complete.

It is understood, of course, that the bodied component may be any water soluble or water dispersible substance not deleterious to gelatin. Among such materials which may be advantageously bodied may be mentioned: concentrated fruit juices such as raspberry, strawberry, apple, grape, cherry, plum, orange, lemon and lime or their extracts or other flavoring oils or extracts such as chocolate, vanilla, oil of peppermint and oil of lime; perfumes and essences such as rose water, rose oil, orange flower water, peppermint water, neroli oil, lavender oil, geranium oil, bergamot oil; vitamins and medicinals such as ascorbic acid, thiamin, the hormones, minerals, detergent pastes and the like.

Many of these substances while not water soluble can be rendered water dispersible by addition of suitable surface active agents. Such a situation is frequently desirable where mixtures of water soluble and water insoluble materials is desired, as for instance, a vitamin plus a flavor or a perfume oil plus a detergent.

Either hard (unplasticized) or soft (plasticized) gelatin may be used. The gelatin may be tested by filling gelatin capsules with solutions and observing the effect upon storage. The following examples illustrate water containing solutions which when capsulated in hard gelatin show substantially no softening toward the capsule after 48 hours of storage. A blank sample, containing no inhibitor softens the enclosing capsule in three minutes.

| Example | Inhibitor | Percent Water |
|---|---|---|
| I | 6-polyoxyethylene sorbitol [1] | 10 |
| II | ----do---- | 25 |
| III | 20-polyoxyethylene sorbitol | 10 |
| IV | ----do---- | 25 |
| V | Nonaethylene glycol | 10 |
| VI | ----do---- | 25 |
| VII | Heptaethylene glycol | 10 |
| VIII | Heptaethylene glycerol | 25 |
| IX | Diglycerol | 10 |
| X | ----do---- | 25 |

[1] Indicates average number of polyoxyalkylene groups per mol of polyol.

Soft or plasticized gelatin films $\tfrac{1}{16}''$ thick are cast from a composition containing 37% gelatin, 25% of an 85% aqueous commercial sorbitol syrup as plasticizer and 38% water. Two inch squares of this film are clamped over Payne moisture determination cups which have been filled with aliphatic polyol ethers containing various concentrations of water. The cups are then inverted and the softening tendency of the films noted after 30 hours. A blank test, using water alone breaks through after 45 minutes. The film is very soft after only 5 minutes.

| Example | Inhibitor | Percent Water | Observation |
|---|---|---|---|
| XI | 6-polyoxyethylene sorbitol | 10 | No change. |
| XII | ----do---- | 25 | V. sl. wrinkled.[1] |
| XIII | ----do---- | 50 | Wrinkled. |
| XIV | 20-polyoxyethylene sorbitol | 10 | No change. |
| XV | ----do---- | 25 | V. sl. wrinkled. |
| XVI | ----do---- | 50 | Wrinkled. |
| XVII | 6-polyoxypropylene sorbitol | 10 | V. sl. wrinkled. |
| XVIII | ----do---- | 25 | Sl. wrinkled.[2] |
| XIX | 20-polyoxypropylene sorbitol | 10 | V. sl. wrinkled. |
| XX | ----do---- | 25 | Wrinkled. |
| XXI | Diglycerol | 10 | No change. |
| XXII | ----do---- | 25 | Sl. wrinkled. |
| XXIII | 10-polyoxyethylene glycerol | 10 | Do. |

[1] Very slightly wrinkled.
[2] Slightly wrinkled.

None of the films shows any signs of breakage. All are firm to the touch and none is sticky. At the higher water content the film becomes rather elastic. When the outside gelatin surface is wetted with water, the film readily disintegrates.

It is obvious that mixtures of the above described inhibitors may likewise be employed. Such a mixture would result, for instance, where an ethylene oxide derivative of a polyol was prepared in the presence of water. Such mixtures have been prepared and found suitable for capsulating wherein 6 to 20 mols of ethylene oxide have been combined with sorbitol or glycerine containing as much as 15% water.

Aqueous bodied components for capsulation are compounded as follows:

| Example | Composition |
|---|---|
| XXIV | 40 grams of a 30% aqueous solution of ascorbic acid. 60 grams of 6 polyoxyethylene sorbitol. |
| XXV | 15 grams of rose water. 85 grams of 10 polyoxyethylene sorbitol. |
| XXVI | 25 grams of strawberry concentrate. 75 grams of diglycerol. |

The compositions are then capsulated by the conventional methods employed in the capsulation of liquids.

It will be apparent to those skilled in the art that many equivalent modifications are possible without departing from the spirit of the invention.

What is claimed is:

1. A sealed gelatin capsule, enclosing a liquid vehicle of an aqueous solution of a polyoxyalkylene ether of an aliphatic polyol, containing from 6 to 20 oxyalkylene groups per mol of polyol, wherein the oxyalkylene group contains from 2 to 3 carbon atoms, and where the ether constitutes at least 50% by weight of the total of water and ether, but not more than 95% of said total, said vehicle carrying a bodied component, not per se deleterious to gelatin.

2. The composition of claim 1 wherein the polyol is sorbitol.

3. The composition of claim 1 wherein the polyol is ethylene glycol.

4. The composition of claim 1 wherein the polyol is glycerol.

5. The composition of claim 1 wherein the ether is a polyoxyethylene sorbitol ether.

6. A method of producing a gelatin capsulated composition of an aqueous vehicle and a bodied component not per se deleterious to gelatin, comprising mixing a polyoxyalkylene ether of an aliphatic polyol, containing from 6 to 20 oxyalkylene groups per mol of polyol, wherein the oxyalkylene group contains from 2 to 3 carbon atoms, and water in proportions to form a solution containing said ether in an amount not less than 50% nor more than 95% by weight of the total of water and ether, adding the said component to said solution and thereafter capsulating the composition so produced in a water soluble gelatin container.

WILLIAM C. GRIFFIN.

References Cited in the file of this patent

UNITED STATES PATENTS

| Number | Name | Date |
|---|---|---|
| 1,970,578 | Schoeller et al. | Aug. 21, 1934 |
| 2,089,569 | Orthner et al. | Aug. 10, 1937 |
| 2,234,479 | Scherer | Mar. 11, 1941 |
| 2,580,683 | Kreuger | Jan. 1, 1952 |